(12) United States Patent
Chiu et al.

(10) Patent No.: US 6,561,054 B1
(45) Date of Patent: May 13, 2003

(54) BALL SCREW WITH SPACERS

(75) Inventors: Yueh-Ling Chiu, Taichung (TW); Paul Yang, Taichung Hsien (TW)

(73) Assignee: Hiwin Technologies Corp. (TW)

( * ) Notice: Subject to any disclaimer, the term of this patent is extended or adjusted under 35 U.S.C. 154(b) by 0 days.

(21) Appl. No.: 09/783,543

(22) Filed: Feb. 15, 2001

(30) Foreign Application Priority Data

Mar. 3, 2000 (TW) .................................... 089103756 A

(51) Int. Cl.[7] .............................................. F16H 25/22
(52) U.S. Cl. ................................ 74/424.88; 74/424.82
(58) Field of Search ........................ 74/424.81, 424.82, 74/424.88

(56) References Cited

U.S. PATENT DOCUMENTS 4,277,117 A * 7/1981 George ........................ 384/520
6,095,009 A * 8/2000 Takagi ....................... 74/424.88
6,113,274 A * 9/2000 Horimoto ..................... 384/43
6,176,149 B1 * 1/2001 Misu ........................... 74/521
6,347,558 B1 * 2/2002 Miyaguchi et al. ........... 384/43

FOREIGN PATENT DOCUMENTS

DE          19925040     * 12/1999
JP          11-315835    * 11/1999

* cited by examiner

Primary Examiner—William C Joyce
(74) Attorney, Agent, or Firm—Bacon & Thomas, PLLC

(57) ABSTRACT

A spacer interposed between two adjacent balls formed into an elaborately designed cylinder like configuration which is able to minimize noise, vibration and frictional loss due to mutual collision and impact of the balls. The spacer is provided with a let through hole therein for further enhancing lubricating and cooling effect.

5 Claims, 4 Drawing Sheets

BALL SCREW WITH SPACERS

BACKGROUND OF THE INVENTION

1. Field of the Invention

The present invention relates to a ball screw with spacers and more particularly, to a ball screw with spacers each of them being interposed between two adjacent balls so as to prevent balls from colliding and impacting with each other.

2. Description of the Prior Art

A ball screw unit is combination of a screw bolt and a nut assembly with a plurality of circulating balls amidst them. The outer surface of the screw bolt is formed into screw grooves having a semi circular cross section. The nut assembly consists of a nut body and accessories providing means for the balls to roll around. The nut body is hollow with its inner surface formed into screw grooves having a semi circular cross section and each groove is facing against its corresponding groove formed on the screw bolt. The plurality of balls contained between the screw bolt and the nut assembly are circulating along the grooves with the aid of the accessories such that the ball screw and the nut assembly is rotatable with each other.

As it is well known that the balls are mostly made of metallic material, noise and vibration is apt to occur as they roll along the screw grooves of the screw bolt and the nut assembly. In addition, mutual friction between adjacent balls is produced due to different moving direction between them. When the balls are meandering along the circulation passage, the different curvatures of the circulation passage and the screw grooves thereof cause change of advancing speed of the balls with the result of mutual collision and impact among them. Recently there is better material, for example, ceramic is used to form a lighter ball than a conventional steel ball so as to reduce impact energy, and instead, increase hardness and improve anti-abrasion and damping effect. Meanwhile, there is a big problem that average users are unable and unwilling to afford use of this new and expensive ball.

FIG. 7 is a schematic view showing a structure of a conventional ball screw for moderating friction and impact between the balls. As shown in FIG. 7, a plurality of balls 4 are rolling amidst screw grooves 11 of the screw bolt and screw grooves 21 of the nut assembly. A smaller spacer ball 6 is provided between two adjacent balls 4 so as to keep the two adjacent balls 4 rotating in the same direction thereby reducing frictional resistance between the balls and improving movility of the screw bolt. Generally, the ball 4 and the spacer ball 6 are made of the same material. Although the frictional resistance arising from the different rotational direction of the balls 4 in both grooves 11 and 21 is evaded, yet there still remains no answer to the problem as to mutual collision and impact of the ball 4 moving along in the circulation passage due to change of speed.

U.S. Pat. No. 4,505,522 provided a method to change accommodative numbers of balls for reducing the balls which enter or go out of the circulation passage. However, owing to complexity of the circulation passage pertaining to the ball screw mechanism, a simple geometrical figure is even found to be difficult to design in the case such a technology is applied. As a result, control of amount of balls for the screw bolt does not effectively utilized. If it is desired to well utilize the method disclosed by this cited invention, determination of a precise geometrical figure for the circulation passage should be made in the first priority, this further accompanies fabrication difficulty with the ball screw mechanism.

The U.S. Pat. No. 5,615,955 suggested use of materials with lubricating function such as oil containing plastics to form the spacer balls 6 shown in FIG. 7 to exhibit both anti-vibration property and lubrication effect. It is really with preferable flexibility to deformation and reduces noise arising from impact as well. However, it is regretful that the above advantages are counteracted by the fact that accommodative balls 4 which can effectively with stand load in the ball screw mechanism are reduced to half as many as those are originally contained therein due to large available spacing is occupied by the spacer balls 6 whose sizes are nearly equal to those of the balls 4. The strength of ball screw mechanism is therefore degraded.

SUMMARY OF THE INVENTION

The present invention has been made in order to eliminate the inconvenience inherent to the conventional techniques as mentioned above. Thus, an object of the present invention is aimed at solving the problem of noise and vibration arising from mutual collision and impact of balls which are rolling along in the screw grooves of both screw bolt and nut body and in the circulation passage due to difference of moving speed and force impressed each other.

It is another object of the present invention to prevent reducing amount of load carrying balls due to occupation of available space by bulky spacer balls.

These and other objects of the present invention are achieved by a smaller spacer to be interposed between two adjacent balls so as to minimize frictional resistance and impact force therebetween thereby reducing noise and vibration as small as possible. This spacer is designed into a cylindrical shaped body with two ends formed into inwardly concaved surfaces so as to match the shape of the balls thereby greatly reducing the space between two adjacent balls. As a result, the amount of balls accommodative in the ball screw unit is increased with enhanced mechanical strength.

In the present invention, the above mentioned cylindrical spacer does not roll in the circulation passage, in order to prevent the unrolling spacer from causing undesired contact friction between wall surfaces of the screw grooves and the circulation passage, or even exerting a normal pressure against the walls thereof, the outer diameter of the cylinder is made smaller than that of the ball.

In the present invention, in order to prevent the spacer from contacting the side wall surface of abruptly curved circulation passage of a small curvature, or even produce a normal pressure to the wall surfaces so as to further exacerbate the increase of frictional resistance, the silhouette of the cylindrical shaped spacer, as observed in the front view, is formed into two inwardly concaved arcuate figures. By so, the probability of frictional contact between surfaces of the cylindrical shaped spacer and the circulation passage wall is reduced to a minimum.

Since the balls contact the spacers with a rather large area, the oil film on the surface of rolling ball is apt to be abrased. In order to minimize the contact surface of the spacer with the ball, the inwardly concaved arcuate surface of the spacer is formed of two truncated conical surfaces as it is observed from the front, and the radius of the arcuate surface is slightly larger than that of the ball, so that the ball makes point contact with two truncated cone surfaces (as it can be observed from the front view.

In the present invention, because the spacer would not rotate in the operation of the ball screw unit, the lubricating oil can not be imparted from ball to ball depending on the spacer balls for media as conventional techniques do. In order to achieve a preferable lubricating effect, a let through hole is provided amidst of the spacer so as to carrying away excessive oil contained in the oil film of the ball and then impart it to adjacent ball with a poorly thin oil film or even in lack of oil at all, therefore, the object of uniform distribution of lubricating oil can be attained. Besides, the environmental pollution caused by overflow of the oil can be avoided and cooling effect can also be carried out by smooth flow of the lubricating oil.

In the present invention, for eliminating the disadvantage that the lubricating oil can not ooze smoothly through the closed contact surface between the ball and the spacer, cold instead, passing in vain via the let through hole, the inwardly concaved end surface of the spacer is further formed into a sinuate shape so as to divide the contact surface between the ball and the spacer into a plurality of intermittent contact points, thereby improving the flow of lubricating oil and lowering frictional resistance.

In the present invention, material for example, plastics, high molecular compounds, reinforced plastics, and ceramic are usable for fabricating low friction and anti-abrasive spacer. As for the fabrication method, forming by plastic ejection is recommendable for simplicity and lowering production cost.

Besides, oil containing materials are recommendable for fabricating the spacer so as to solve the problem of exaggerate consumption of lubricant oil in ball screws.

BRIEF DESCRIPTION OF THE DRAWINGS

The above objects and other advantages of the present invention will become more apparent by describing in detail the preferred embodiments of the present invention with reference to the attached drawings in which.

DETAILED DESCRIPTION OF THE PREFERRED EMBODIMENT

Figure 1:
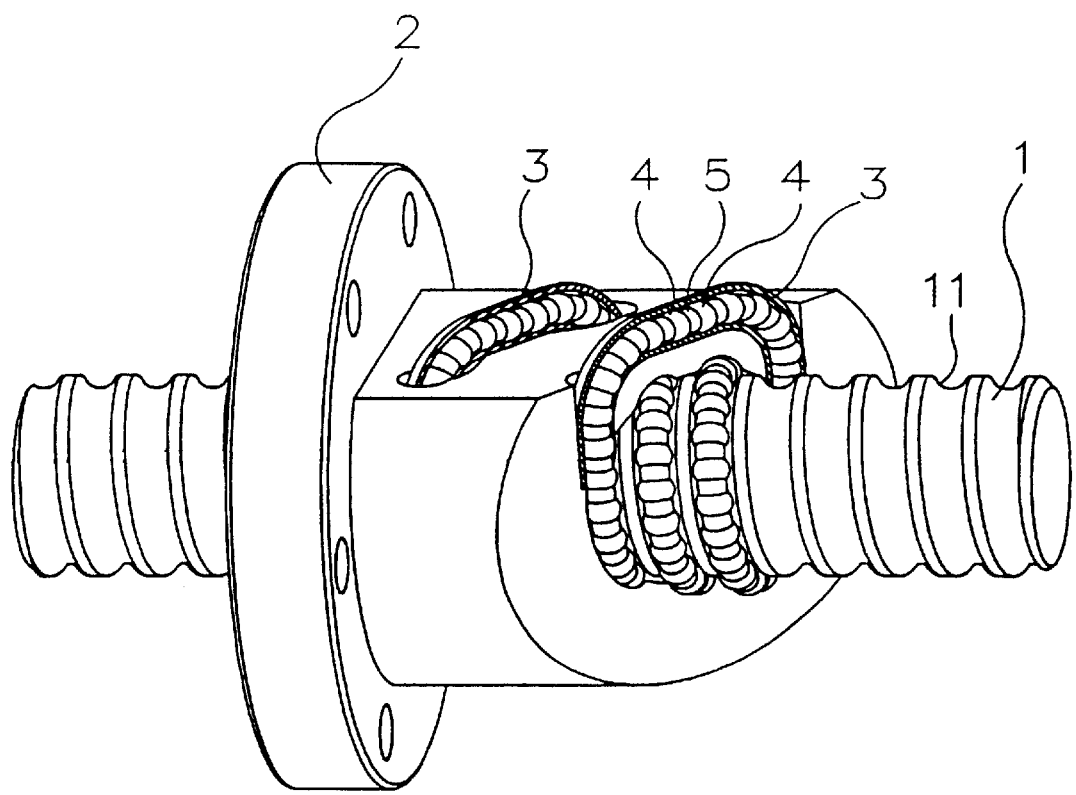
FIG. 1 is a cross sectional view of a ball screw unit using spacers of the present invention in an embodiment.

FIG. 1 is a cross sectional view of a ball screw unit using spacers of the present invention in an embodiment. As shown in FIG. 1, the ball screw unit consists of a screw bolt 1 and a nut body 2. The screw bolt 1 has screw grooves 11 of semi-circular cross section formed around the outer surface thereof, while the same screw grooves corresponding to the former grooves are formed on the inner surface of the nut body 2. A plurality of balls 4 and spacers 5 are accommodated in the screw grooves of the ball screw 1 and the nut body 2, and in a circulation passage 3 which allows the balls 4 and spacer 5 to circulate along. Each spacer 5 is interposed between two adjacent balls 4 for isolating the balls 4. When the screw bolt 1 revolves, the plurality of balls 4 follow to roll so as to cause a relative movement between the screw bolt 1 and the nut body 2. At the same time, being driven by the balls 4, the spacers 5 travel along in the screw grooves of the screw bolt 1 and the nut body 2, and in the circulation passage 3 with the rolling balls 4, but the spacers 5 do not roll.

Figure 2:
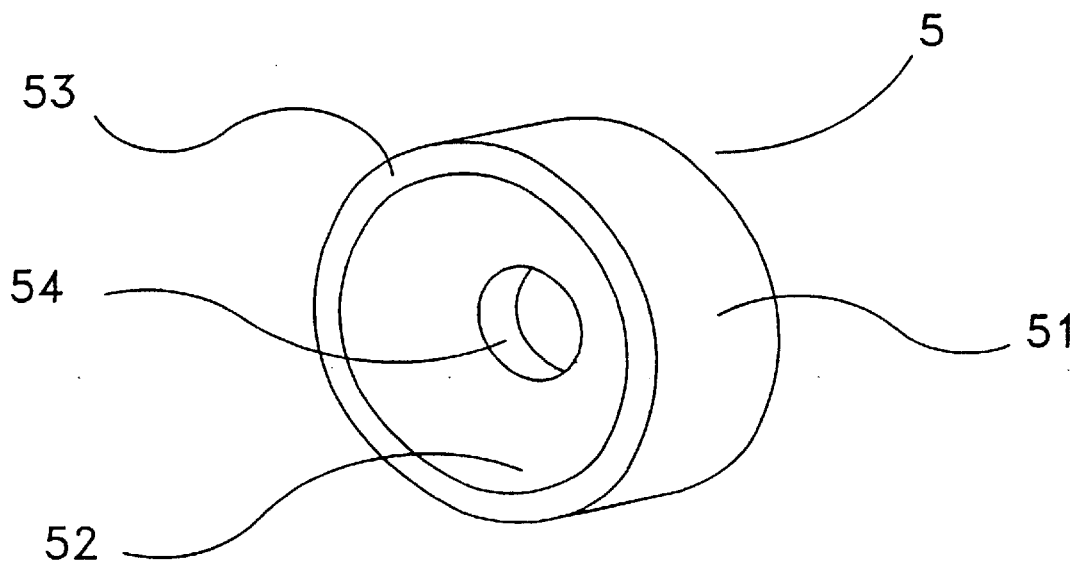
FIG. 2 is a three dimensional schematic view of the spacer of FIG. 1.
Figure 3:
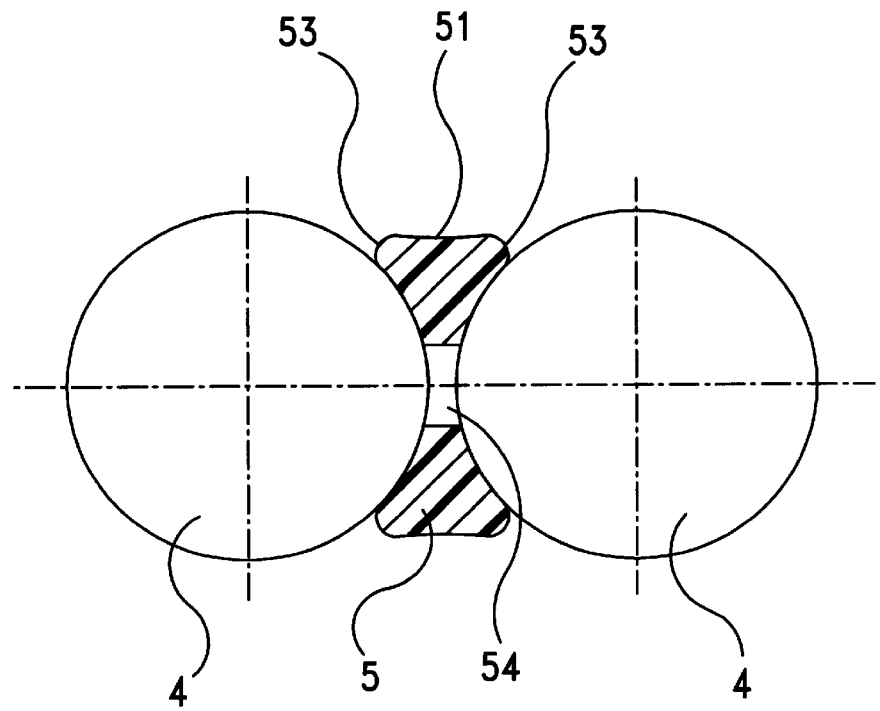
FIG. 3 is a cross sectional schematic view of the spacer of the present invention which is interposed between two adjacent balls.

FIG. 2 is a three dimensional view of the spacer of FIG. 1, and FIG. 3 is a cross sectional view showing a spacer is interposed between two adjacent balls. As shown in FIGS. 2 and 3, the contour of the spacer 5 is formed like a cylinder having a cylindrical surface 51 and two inwardly concaved surfaces 52 at its both ends thereof. The contact edges of the cylindrical surface 51 with two inwardly concaved end surfaces 52 are beveled to form rounds 53. There is a let through hole 54 bored through the longitudinal axis of the spacer 5 so as to carry away excessive oil contained in the oil film of the ball 4 and then impart it to adjacent ball 4 having a poorly thin oil film or even in lack of oil at all, thereby uniformly distributing the lubricating oil. Besides, environmental pollution which might be caused by overflow of oil can be avoided, and an additional cooling effect can be carried out by smooth flow of the lubricating oil through the let through hole 54.

Figure 4:
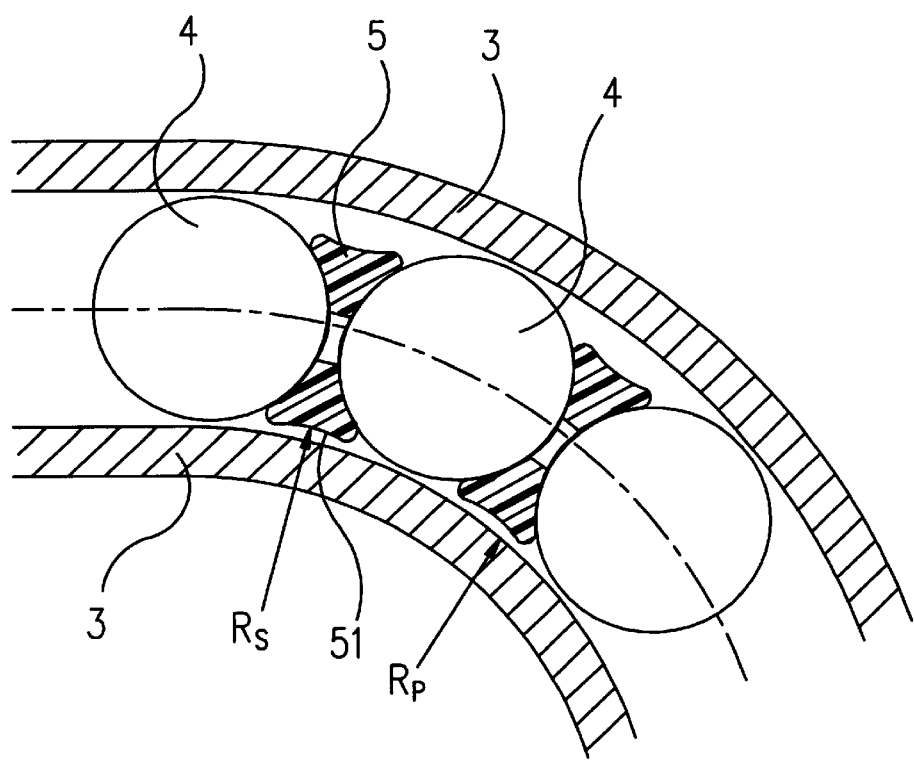
FIG. 4 is a schematic view that showing the spacers of the present invention are located in the circulation passage of the ball screw unit.

FIG. 4 is a view that shows the spacers are located in the circulation passage 3. As the passage 3 is formed in arcuate shape, in order to minimize frictional contact between the cylindrical surface 51 and the circulation passage 3, the cylindrical surface 51 of the spacer 5 is made into two truncated conical surfaces. Referring to FIG. 4, the smallest radius of curvature between two walls of the circulation passage is Rp, and the arc radius of curvature of the cylindrical surface is designed as Rs, where if Rs is basically kept not larger than Rp, an excessive frictional contact between the spacer 5 and the circulation passage 3 can be substantially evaded.

Figure 5:
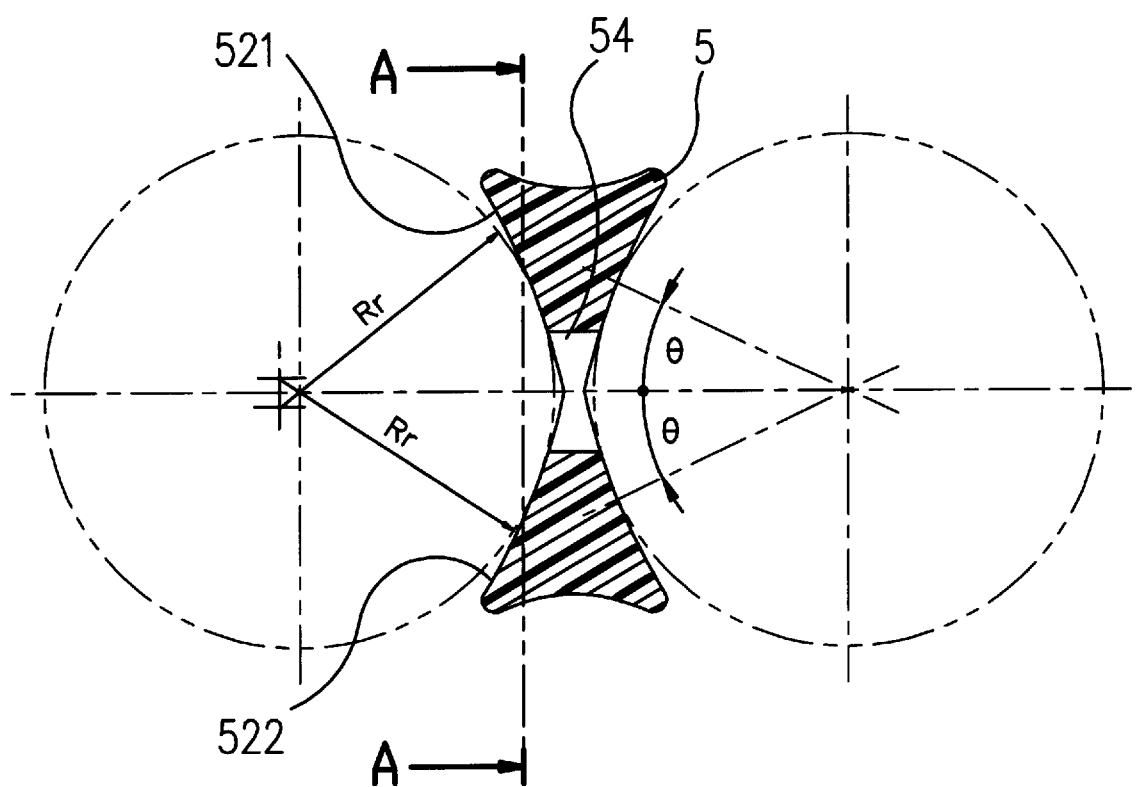
FIG. 5 is a schematic view of the spacer according to the present invention in another embodiment.

FIG. 5 is a schematic view of the spacer in another embodiment. In order to minimize the contact surface of the ball with the spacer as small as possible so as to protect the oil film which is formed on the ball, the inwardly concaved surface 52 of the spacer is formed of a substantially conical surface which can be represented by two arcuate surfaces 521, 522 of the same radius that is slightly larger than the radius of the ball 4. Therefore, the ball 4 is point contacted with both surfaces 521, 522. According to an actual measurement, when the ratio of radius of curvature Rr of the arcuate surfaces 521, 522 to the diameter of the ball is kept at the range of 0.5~0.8, a considerably preferable effect is obtained. The angle θ formed between two contact points to the arc center is preferably in the range of 20°~40°.

Figure 6:
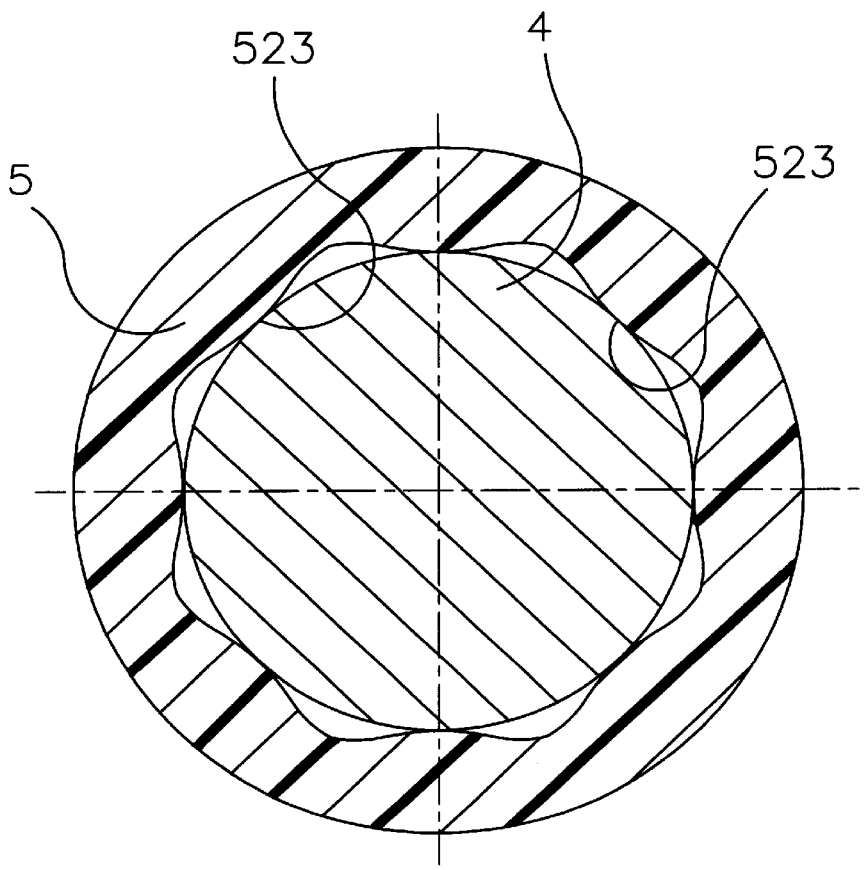
FIG. 6 is a cross sectional view of FIG. 5 cut along line A—A.
Figure 7:
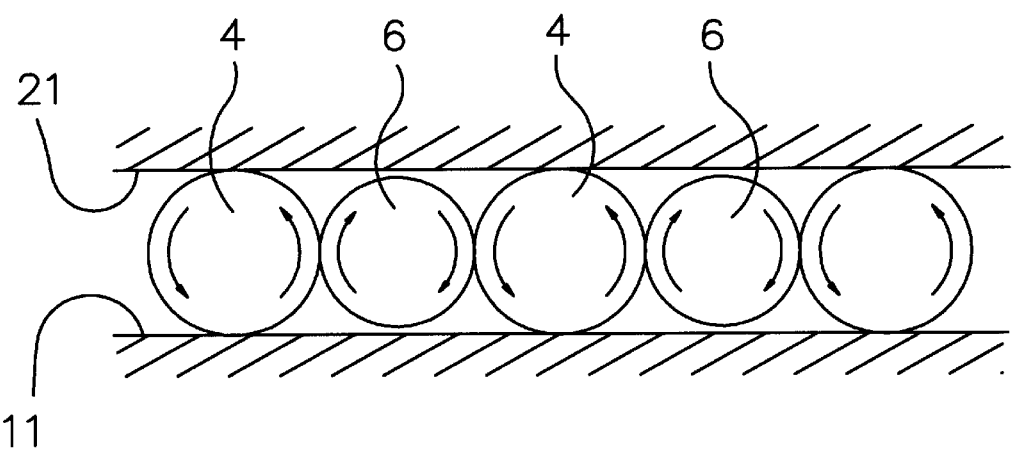
FIG. 7 is a schematic view showing a structure of a conventional ball screw for moderating friction and impact between the ball.

FIG. 6 is a cross sectional view of FIG. 5 cut along line A—A. For eliminating the disadvantage that the lubricating oil can not ooze smoothly into the closed contact surface between the ball 4 and the spacer 5, and instead, passing via the let through hole 54 in vain, the surface 52 of the spacer 5 is further formed into sinuate shaped stripes 523 so as to divide the contact surface into a plurality of intermittent contact points thereby improving the flow of lubricating oil and lowering frictional resistance.

Those who are skilled in the art will readily perceive how to modify the invention. Therefore the appended claims are to be construed to cover all equivalent structures which fall within the true scope and spirit of the invention.

What is claimed is:

1. A ball screw with spaces comprising at least a screw bolt, a nut body unit and a plurality of balls and spacers circulating between said screw bolt and said nut body unit, wherein:

the outer surface of said screw bolt is formed into screw grooves having semicircular-liked cross section;

said nut body unit including at least a nut body and accessories for circulation of said balls, said nut body is hollow while its inner surface is formed into similar screw grooves of semi-circular-liked cross section corresponding to those formed around said screw bolt;

a plurality of balls and spacers are accommodated in said screw grooves of said screw bolt and said nut body, and each of said spacers is interposed between adjacent ones of said balls, said balls and spacers are adapted to be located in a circulation passage;

said balls are spherically shaped and made of metallic material;

each of said spacers comprises a concave contour that is substantially cylindrical in shape and inwardly curved, the radius of the concave contour is less than any radius of said circulation passage, the largest diameter of each of said spacers is smaller than that of said balls, each of said spacers includes two end surfaces that are formed into two substantially concaved curved surfaces that are inwardly curved towards the other, each of the substantially concaved curved surfaces are in contact with an adjacent one of said balls; and wherein each of said inwardly concaved surface of said spacer is formed into sinuate shaped stripes.

2. The ball screw of claim 1, wherein the inwardly concaved curved surfaces of the spacers are substantially conical in shape.

3. The ball screw of claim 2, wherein the substantially concaved curved surfaces of said spacers comprise two arcs of the same radii, with each of the radii of the arcs having a different center point, such that the radii of the arcs of the spacers are 0.5~0.8 times greater than the diameter of said balls.

4. The ball screw of claim 1, wherein said spacer is made of low friction and anti-abrasive materials consisting of the group selected from plastics, high molecular compounds, reinforced plastic and ceramic.

5. The ball screw of claim 4, wherein said spacers comprise materials that contain oil.

* * * * *